(12) United States Patent
Kawashima

(10) Patent No.: US 10,661,759 B2
(45) Date of Patent: May 26, 2020

(54) WINDSHIELD WIPER CONNECTOR

(71) Applicant: Pylon Manufacturing Corporation, Deerfield Beach, FL (US)

(72) Inventor: Hiroshi Kawashima, Sunrise, FL (US)

(*) Notice: Subject to any disclaimer, the term of this patent is extended or adjusted under 35 U.S.C. 154(b) by 265 days.

(21) Appl. No.: 15/600,201

(22) Filed: May 19, 2017

(65) Prior Publication Data

US 2017/0334403 A1 Nov. 23, 2017

Related U.S. Application Data

(60) Provisional application No. 62/338,990, filed on May 19, 2016.

(51) Int. Cl.
*B60S 1/40* (2006.01)
*B60S 1/38* (2006.01)

(52) U.S. Cl.
CPC ............ *B60S 1/4038* (2013.01); *B60S 1/387* (2013.01); *B60S 1/3851* (2013.01);
(Continued)

(58) Field of Classification Search
CPC .... B60S 1/4038; B60S 1/4041; B60S 1/4083; B60S 1/4087; B60S 1/4067; B60S 1/4074;
(Continued)

(56) References Cited

U.S. PATENT DOCUMENTS

D56,762 S 7/1866 Minier
2,310,751 A 2/1943 Scinta
(Continued)

FOREIGN PATENT DOCUMENTS

BR 102015007588 A2 4/2016
DE 10230457 A1 1/2004
(Continued)

OTHER PUBLICATIONS

Naedele, M.,"An Access Control Protocol for Embedded Devices," Industrial Informatics, 2006 IEEE International conference on IEEE, PI, dated Aug. 1, 2006, Retrieved from the Internet URL: http://ieeexplore.ieee.org/document/4053450/, pp. 565-569.
(Continued)

*Primary Examiner* — Gary K. Graham
(74) *Attorney, Agent, or Firm* — The Brickell IP Group, PLLC; Javier Sobrado; A. Robert Weaver

(57) ABSTRACT

A windshield wiper connector having a peripheral wall having at least two opposing peripheral side walls, a top surface extending from one of the two opposing peripheral side walls to the other; and a channel formed in the top surface, and extending longitudinally along the top of the connector. The connector including a groove near to the proximal end of the connector and sized to be capable of engaging a trapezoidal roller of a wiper arm. The opposing peripheral side walls having a retaining pin aperture aligned with one another and sized to be capable of accepting a retaining pin of at least one pin-type windshield wiper arm. The channel on the top of the connector sized to be capable of accepting a bayonet style wiper arm. A wiper blade assembly having a wiper strip, a force distribution structure, and a connector as described above.

20 Claims, 8 Drawing Sheets

(52) U.S. Cl.
CPC ........... *B60S 1/4003* (2013.01); *B60S 1/4083* (2013.01); *B60S 1/407* (2013.01); *B60S 1/4041* (2013.01); *B60S 1/4045* (2013.01); *B60S 1/4048* (2013.01); *B60S 1/4074* (2013.01); *B60S 1/4077* (2013.01); *B60S 1/4087* (2013.01)

(58) Field of Classification Search
CPC ........ B60S 1/4003; B60S 1/407; B60S 1/387; B60S 1/4048; B60S 1/4045; B60S 1/4077
USPC ..................................................... 15/250.32
See application file for complete search history.

(56) References Cited

U.S. PATENT DOCUMENTS

| | | |
|---|---|---|
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynn |
| 3,192,551 A | 7/1965 | Appel |
| 3,234,578 A | 2/1966 | Goulb et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |

(56) References Cited

U.S. PATENT DOCUMENTS

| | | |
|---|---|---|
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A * | 4/1996 | Wagner ............... B60S 1/3806 15/250.201 |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |

(56) References Cited

U.S. PATENT DOCUMENTS

| | | |
|---|---|---|
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski et al. |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |

(56) References Cited

U.S. PATENT DOCUMENTS

| | | |
|---|---|---|
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer et al. |
| 7,908,703 B2 | 3/2011 | van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Beek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |

(56) References Cited

U.S. PATENT DOCUMENTS

| | | |
|---|---|---|
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op'T Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op'T Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op'T Roodt et al. |
| 8,595,889 B2 | 12/2013 | Op'T Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op'T Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op'T Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |

(56) References Cited

U.S. PATENT DOCUMENTS

| | | |
|---|---|---|
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| D765,501 S | 9/2016 | Peers et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| D796,413 S | 9/2017 | Di Iulio |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0197047 A1 | 8/2009 | Teranishi |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Bealen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0066857 A1 | 3/2012 | Webert |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |

(56) References Cited

U.S. PATENT DOCUMENTS

| | | |
|---|---|---|
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0185890 A1 | 7/2013 | Ku |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0212828 A1 | 8/2013 | Coughlin |
| 2013/0219649 A1 | 8/2013 | Tolontinto et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115811 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0121644 A1 | 5/2015 | Young, III et al. |
| 2015/0135468 A1 | 5/2015 | Kim |
| 2015/0151718 A1 | 6/2015 | Moll |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |
| 2017/0334400 A1 | 11/2017 | Kawashima |
| 2017/0334404 A1 | 11/2017 | Kawashima |
| 2017/0334406 A1 | 11/2017 | Kawashima |
| 2017/0334407 A1 | 11/2017 | Kawashima |
| 2017/0334769 A1 | 11/2017 | Luzzato et al. |

FOREIGN PATENT DOCUMENTS

| | | |
|---|---|---|
| DE | 1224866 B4 | 1/2007 |
| DE | 4224866 B4 | 1/2007 |
| EP | 2781416 A1 | 9/2014 |
| WO | 2017/201458 A1 | 11/2017 |
| WO | 2017/201464 A1 | 11/2017 |
| WO | 2017/201470 A1 | 11/2017 |
| WO | 2017/201473 A1 | 11/2017 |
| WO | 2017/201485 A1 | 11/2017 |

OTHER PUBLICATIONS

"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.

"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.

Final Rejection towards U.S. Appl. No. 13/679,646 dated Jul. 14, 2017.

Office Action issued in connection with EP Application No. 12171721.9 dated Aug. 16, 2017.

Non-Final Rejection towards U.S. Appl. No. 14/715,144 dated Nov. 15, 2017.

International Search Report and Written Opinion issued in PCT Application No. PCT/US2017/033622 dated Aug. 11, 2017.

International Search Report and Written Opinion issued in PCT Application No. PCT/US2017/033629 dated Aug. 22, 2017.

International Search Report and Written Opinion issued in PCT Application No. PCT/US2017/033640 dated Aug. 23, 2017.

International Search Report and Written Opinion issued in PCT Application No. PCT/US2017/033657 dated Sep. 28, 2017.

International Search Report and Written Opinion issued in PCT Application No. PCT/US2017/033643 dated Oct. 32, 2017.

Forch, R., et al., "Appendix C: Contact Angle Goniometry," Surface Design: Applications in Bioscience and Nanotechnology, pp. 471-473 (Sep. 9, 2009).

International Search Report and Written Opinion issued in PCT Application No. PCT/US2017/033643 dated Oct. 2, 2017.

International Search Report and Written Opinion issued in PCT Application No. PCT/US2017/059275 dated Jan. 1, 2018.

* cited by examiner

WINDSHIELD WIPER CONNECTOR

CROSS REFERENCE TO RELATED APPLICATIONS

This application claims the benefit of U.S. Provisional Application No. 62/338,990 filed May 19, 2016, the disclosure of which is hereby incorporated herein by reference in its entirety.

TECHNICAL FIELD

This invention relates in general to windshield wipers, and more particularly, to an improved connector for a windshield wiper that allows the windshield wiper to be attached to multiple windshield wiper arm configurations. The invention is also directed to windshield wipers incorporating these novel connectors.

BACKGROUND OF THE INVENTION

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture Thus, there is a need for inexpensive connectors that are capable of securing a windshield wiper blade to a variety of arms. In particular, it would be desirable to have a connector that can be attached to a wiper blade that will allow the wiper blade to be locked to a wide variety of wiper arms despite their various locking mechanisms. It would also be desirable to have a windshield wiper connector that can be fabricated or molded as a single piece at low-cost. The prior art fails to provide a low-cost windshield wiper connector capable of attachment to a wide variety of windshield wiper arms, much less for the purpose of reducing the amounts of inventory parts required to supply a vehicle market that uses a wide variety of windshield wiper arm types.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

This invention is generally directed to novel connectors for windshield wiper blades and wiper blades containing same. More particularly, the invention relates, in part, to a windshield wiper connector that can accommodate multiple pin-type windshield wiper arms having varying pin lengths and locking mechanisms, as well as bayonet and trapezoid roller style wiper arms.

In certain embodiments, a windshield wiper connector may include a peripheral wall having at least two opposing peripheral side walls, a top surface extending from one of the two opposing peripheral side walls to the other; and a channel formed in the top surface, and extending longitudinally along the top of the connector. The connector may also include a groove near to the proximal end of the connector and sized to be capable of engaging a trapezoidal roller of a wiper arm. The opposing peripheral side walls may each have a retaining pin aperture aligned with one another and sized to be capable of accepting a retaining pin of at least one pin-type windshield wiper arm. The channel on the top of the connector may be sized to be capable of accepting a bayonet style wiper arm.

In certain embodiments, a wiper blade assembly may include a wiper strip, a force distribution structure, a connection device, and a connector. The connector may include a peripheral wall having at least two opposing peripheral side walls, a top surface extending from one of the two opposing peripheral side walls to the other; and a channel formed in the top surface, and extending longitudinally along the top of the connector. The connector may also include a groove near to the proximal end of the connector and sized to be capable of engaging a trapezoidal roller of a wiper arm. The opposing peripheral side walls may each have a retaining pin aperture aligned with one another and sized to be capable of accepting a retaining pin of at least one pin-type windshield wiper arm. The channel on the top of the connector may be sized to be capable of accepting a bayonet style wiper arm.

DETAILED DESCRIPTION OF THE PREFERRED EMBODIMENT

Figure 1:
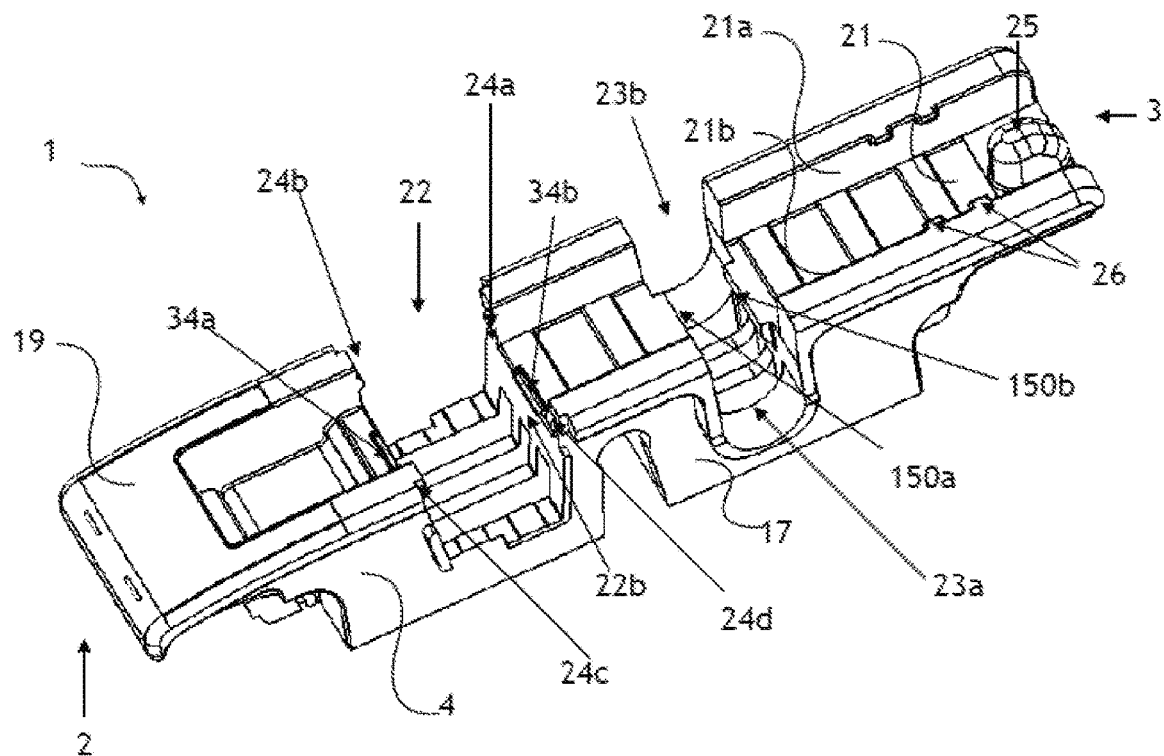
FIG. 1 is a top perspective view of an embodiment of a connector of the disclosure.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments, a windshield wiper connector may include a peripheral wall having at least two opposing peripheral side walls, a top surface extending from one of the two opposing peripheral side walls to the other; and a channel formed in the top surface, and extending longitudinally along the top of the connector. The connector may also include a groove near to the proximal end of the connector and sized to be capable of engaging a trapezoidal roller of a wiper arm. The opposing peripheral side walls may each have a retaining pin aperture aligned with one another and sized to be capable of accepting a retaining pin of at least one pin-type windshield wiper arm. The channel on the top of the connector may be sized to be capable of accepting a bayonet style wiper arm.

In certain embodiments, the top surface of the connector may include a proximal shelf with an opening underneath the proximal shelf that is sized to be capable of receiving the end of a bayonet style arm such that the bottom side of a bayonet style arm rests against a surface of the channel. In certain embodiments, a distal end of the channel may have a pillar extending upwards from a surface of the channel, such that the pillar is capable of engaging a notch on the arm of a notched bayonet style wiper arm as it rests against the surface of the channel.

In certain embodiments, the channel may feature opposing side channel walls, and each side channel wall comprises one or more retaining appendages extending a distance towards opposing side channel walls. The retaining appendages may be capable of holding a bayonet style wiper arm against a surface of the channel. The retaining appendages may be sized such that they are capable of snapping a bayonet style wiper arm into place as the bayonet style wiper arm is pressed towards the surface of the channel.

In certain embodiments, the connector may have at least one rivet passage and arcuate rivet clip in each of the opposing peripheral side walls that may be capable of accepting and securing a rivet of a wiper blade, thereby securing the connector to the wiper blade. In certain embodiments, the connector may have at least one internal longitudinal support wall extending downwards from the top surface and extending substantially along the longitudinal direction of the connector for providing rigidity and structural support for the connector. In certain embodiments, the connector may have at least one internal perpendicular support wall extending downwards from the top surface and extending substantially from the one side wall of the connector to the next side wall.

In certain embodiments, the connector may include a groove cover sized to be capable of covering the groove, wherein the groove cover is shaped to complement the shape of the channel.

In certain embodiments, a wiper blade assembly may include a wiper strip, a force distribution structure, a connection device, and a connector. The connector may include a peripheral wall having at least two opposing peripheral side walls, a top surface extending from one of the two opposing peripheral side walls to the other; and a channel formed in the top surface, and extending longitudinally along the top of the connector. The connector may also include a groove near to the proximal end of the connector and sized to be capable of engaging a trapezoidal roller of a wiper arm. The opposing peripheral side walls may each have a retaining pin aperture aligned with one another and sized to be capable of accepting a retaining pin of at least one pin-type windshield wiper arm. The channel on the top of the connector may be sized to be capable of accepting a bayonet style wiper arm.

In certain embodiments, the wiper blade assembly may have the top surface of the connector include a proximal shelf with an opening underneath the proximal shelf that is sized to be capable of receiving the end of a bayonet style arm such that the bottom side of a bayonet style arm rests against a surface of the channel. In certain embodiments, a distal end of the channel may have a pillar extending upwards from a surface of the channel, wherein the pillar is capable of engaging a notch on the arm of a notched bayonet style wiper arm as it rests against the surface of the channel.

In certain embodiments, the channel may have opposing side channel walls, and each side channel wall comprises one or more retaining appendages extending a distance towards opposing side channel walls. In certain embodiments, the retaining appendages may be capable of holding the a bayonet style wiper arm against a surface of the channel, and wherein the retaining appendages are sized such that they are capable of snapping a bayonet style wiper arm into place as the bayonet style wiper arm is pressed towards the surface of the channel.

In certain embodiments, the wiper blade assembly may have at least one rivet passage and arcuate rivet clip in each of the opposing peripheral side walls of the connector that are capable of accepting and securing a rivet of a wiper blade, thereby securing the connector to the wiper blade. In certain embodiments, the connector may include at least one internal longitudinal support wall extending downwards from the top surface and extending substantially along the longitudinal direction of the connector for providing rigidity and structural support for the connector; and at least one internal perpendicular support wall extending downwards from the top surface and extending substantially from the one side wall of the connector to the next side wall.

In certain embodiments, the wiper blade assembly may include a groove cover sized to be capable of covering the groove, wherein the groove cover is shaped to complement the shape of the channel.

In certain embodiments, the wiper blade assembly may have a force distribution structure that includes a beam. In certain embodiments, the wiper blade assembly may have a force distribution structure that includes a frame.

In certain embodiments the connector for connecting a windshield wiper assembly to a wiper arm may have a peripheral wall having at least two opposing peripheral side walls and a top surface extending from one of the two opposing peripheral side walls to the other. The top surface may have a channel running lengthwise (longitudinally) and extending from the proximal end to the distal end of the connector. Further, at or near the proximal end of the connector, there may be a groove extending from one of the side walls to the opposite side wall sized such that it is capable of accepting a trapezoid roller of a trapezoid roller style wiper arm. The opposing peripheral side walls may each have a retaining pin aperture aligned with one another and sized to be capable of accepting a retaining pin of at least one pin-type windshield wiper arm, such as a French pin style retaining pin.

In some embodiments, the top surface of the connector may further have a proximal shelf with an opening underneath the proximal shelf that is sized to receive the end of a bayonet style arm. The bottom side of a bayonet style arm further rests against the surface of the channel running lengthwise along the connector. The channel extends to the distal end of the connector wherein the arm extends therefrom when properly engaged with the connector.

In some embodiments, the distal end of the channel may have a pillar extending upwards from the surface of the channel. The pillar functions to engage a notch on the arm of a notched bayonet style wiper arm as it rests against the surface of the channel. Further, the opposing side channel walls of the channel may each have one or more retaining appendages extending a distance towards opposing side channel walls. The retaining appendages function to hold the wiper arm against the surface of the channel. The retaining appendages are sized such that the wiper arm snaps into place as it is pressed towards the surface of the channel.

In some embodiments, the connector may have at least one rivet passage and arcuate rivet clip in each of the side walls for accepting and securing a rivet of a wiper blade, thereby securing the connector to the wiper blade. In some of these embodiments, the connector may be capable of being secured to the mounting base of a windshield wiper blade assembly via the rivet through the mounting base.

In some embodiments, the connector may have at least one internal longitudinal support wall extending downwards from the top surface and extending substantially along the longitudinal length of the connector for providing rigidity and structural support for the connector. In some embodiments, the connector may have at least one internal perpendicular support wall extending downwards from the top surface and extending substantially from the one side wall of the connector to the next side wall.

In some embodiments the connector may be fabricated as a single piece.

In addition, the connector is configured such that the orientation of either the windshield wiper or the connector can be reversed based on the particular windshield wiper arm that is being used.

FIG. 1 is a top, perspective view of an embodiment of a connector 1 of the disclosure. The connector 1 has a proximal end 2, and a distal end 3. A peripheral wall 4 extends around the periphery of connector 1. The peripheral wall 4 including a proximal portion, a distal portion, and opposing side portions that connect the proximal and distal portions, referred to as a first side 17 and a second side 18. A top surface 19 extends between opposing peripheral wall side portions. The top surface may also extend beyond the first and second sides of the peripheral wall 4 to form a ledge 20 that extends substantially along the longitudinal length of the connector 1 on each of the first 17 and second 18 sides (see FIG. 2). The top surface 19 may have a channel 21 with opposing channel side walls 21*a*, 21*b* and a bottom wall 21*c* running lengthwise (longitudinally) and extending from the proximal end 2 to the distal end 3 of the connector 1. Further, at or near the proximal end 2 of the connector 1, there may be a groove 22 with opposing groove walls 22*a*, 22*b*, extending from one of the side walls to the opposite side wall sized such that it is capable of accepting a trapezoid roller of a trapezoid roller style wiper arm. The top surface 19 may extend slightly outward into the groove 22 such that retaining flanges 24*a, b, c, d* are formed for holding a trapezoid roller of a trapezoid roller style wiper arm in place within the groove. There may also be channel indentions 34*a*, 34*b* on each side of the groove 22 for engaging roller appendages 33 to aid in holding the roller in place (see FIGS. 9A and 9B).

The opposing peripheral side walls may also each have a retaining pin aperture 23*a*, 23*b* aligned with one another and sized to be capable of accepting a retaining pin of at least one pin-type windshield wiper arm, such as a French pin style retaining pin. The retaining pin aperture 23*a*, 23*b* may also include a retaining pin lock structure 150*a*, 150*b* therein for locking retaining pins that are inserted into the apertures and holding them within the aperture structure. As illustrated, the channel bottom wall 21*c* may extend into the aperture space on each side of the aperture to form the retaining pin lock structure.

In some embodiments, the distal end of the channel 21 may have a pillar 25 extending upwards from the bottom wall 21*c* of the channel 21. The pillar 25 functions to engage a notch on the arm of a notched bayonet style wiper arm as it rests against the surface of the channel (see FIG. 13). Further, the opposing side channel walls 21*a*, 21*b* of the channel may each have one or more retaining appendages 26 extending a distance towards opposing side channel walls 21*a*, 21*b*. The retaining appendages 26 function to hold the wiper arm against the surface of the channel 21. The retaining appendages 26 are sized such that the wiper arm snaps into place as it is pressed towards the surface of the channel.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 1 is fabricated as a single piece. In addition, the connector 1 is configured such that the orientation of either the windshield wiper or the connector can be reversed based on the particular windshield wiper arm that is being used.

Figure 2:
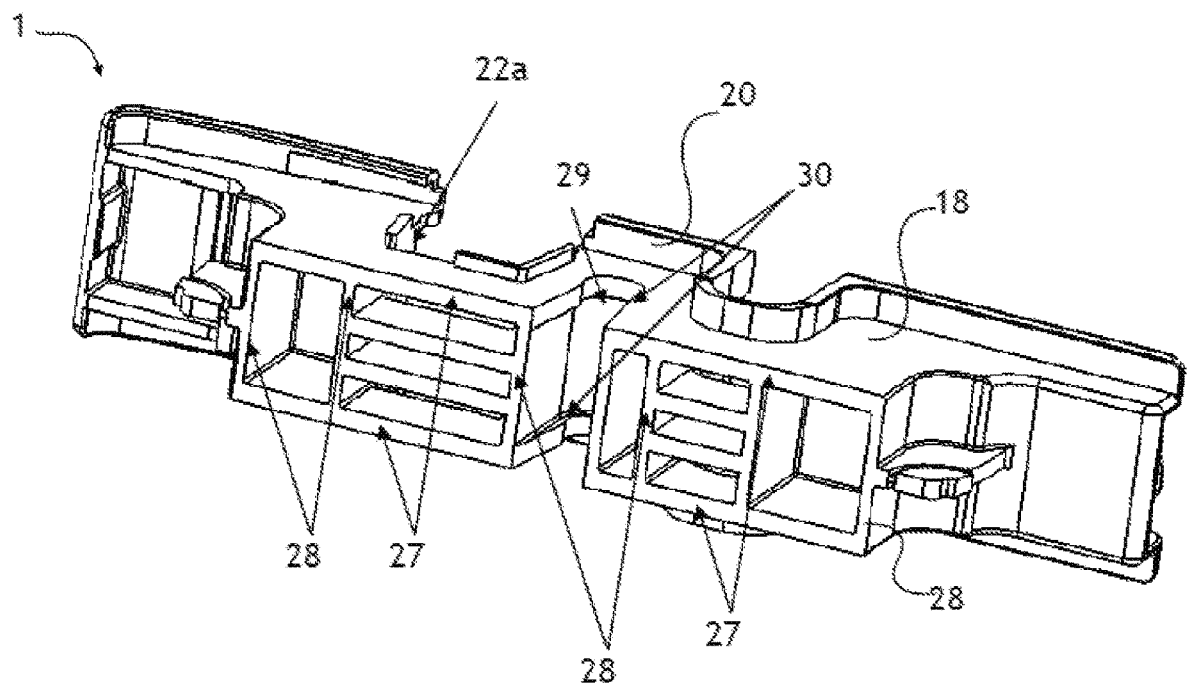
FIG. 2 is a bottom perspective view of an embodiment of the connector shown in FIG. 1 that illustrates the internal support structure on the underside of the connector.

FIG. 2 is a bottom perspective view of an embodiment of a connector 1 of the disclosure that illustrates the internal support structure inside the connector 1. In particular, internal support walls provide rigidity and structural strength to the connector 1. The support walls can extend substantially along the length of the connector continuously, or intermittently, having gaps along the way. In this embodiment, the connector may have at least one internal longitudinal support wall 27 extending downwards from the top surface and extending substantially along the longitudinal length of the connector 1 for providing rigidity and structural support for the connector. In some embodiments, the connector 1 may have at least one internal perpendicular support wall 28 extending downwards from the top surface and extending substantially from the one side wall of the connector 1 to the opposing side wall.

In some embodiments, the connector 1 may have at least one rivet passage 29 and arcuate rivet clip 30 *a, b* in each of the side walls 17, 18 for accepting and securing a rivet of a wiper blade, thereby securing the connector 1 to the wiper blade. In some of these embodiments, the connector 1 may be capable of being secured to the mounting base of a windshield wiper blade assembly via the rivet through the mounting base.

Figure 3:
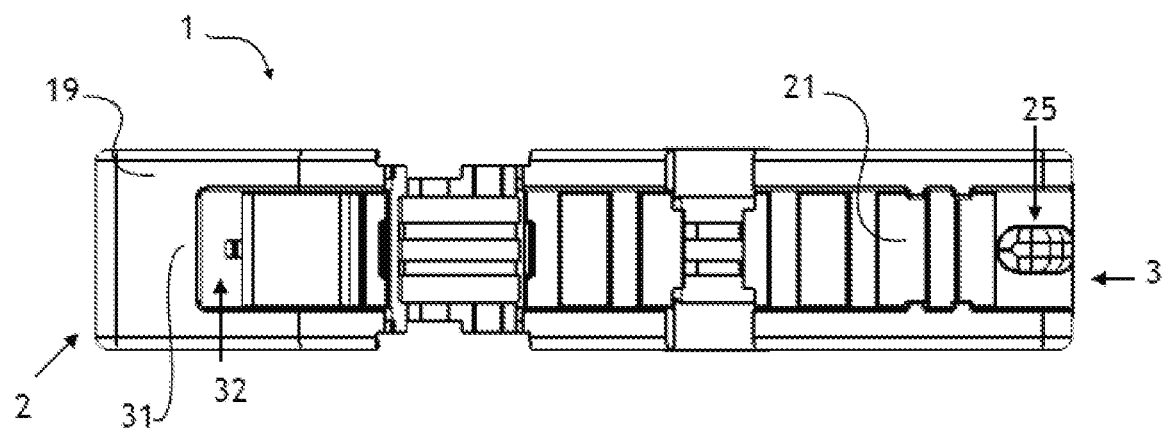
FIG. 3 is a top view of the connector shown in FIG. 1.

FIG. 3 is a top view of an embodiment of a connector 1 of the disclosure that illustrates the top surface 19 of the connector 1 may further have a proximal shelf 31 with an opening 32 underneath the proximal shelf that is sized to receive the end of a bayonet style arm. The bottom side of a bayonet style arm further rests against the bottom wall 21*c* of the channel 21 running lengthwise along the connector 1. The end of the arm would thus seat into the opening 32 and wedge against the underside of the proximal shelf 31. The channel 21 extends to the distal end of the connector wherein the arm extends therefrom when properly engaged with the connector 1.

Figure 4:
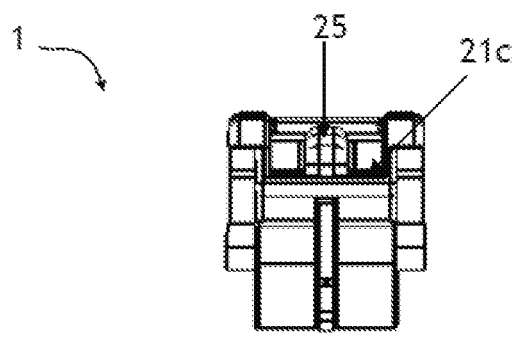
FIG. 4 is distal end view of an embodiment of a connector of the disclosure.

FIG. 4 is a distal end view of an embodiment of the connector 1 that illustrates the distal end 3. Also shown on this view is the pillar 25 extending upwards from the bottom wall 21*c* of the channel 21. Those skilled in the art will recognize that the shape of distal end 2 can vary so long as it does not interfere with attachment of the connector 1 to the wiper arm.

Figure 5:
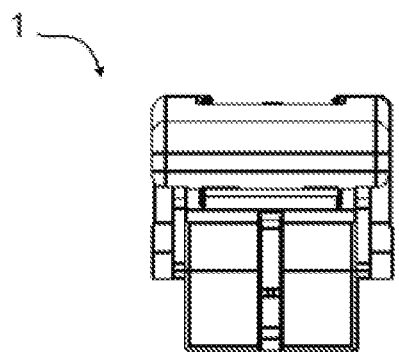
FIG. 5 is proximal end view of an embodiment of a connector of the disclosure.

FIG. 5 is a proximal end view of an embodiment of the connector 1 that illustrates the proximal end 2. Those skilled in the art will recognize that the shape of proximal end 2 can vary so long as it does not interfere with attachment of the connector 1 to the wiper arm.

Figure 6:
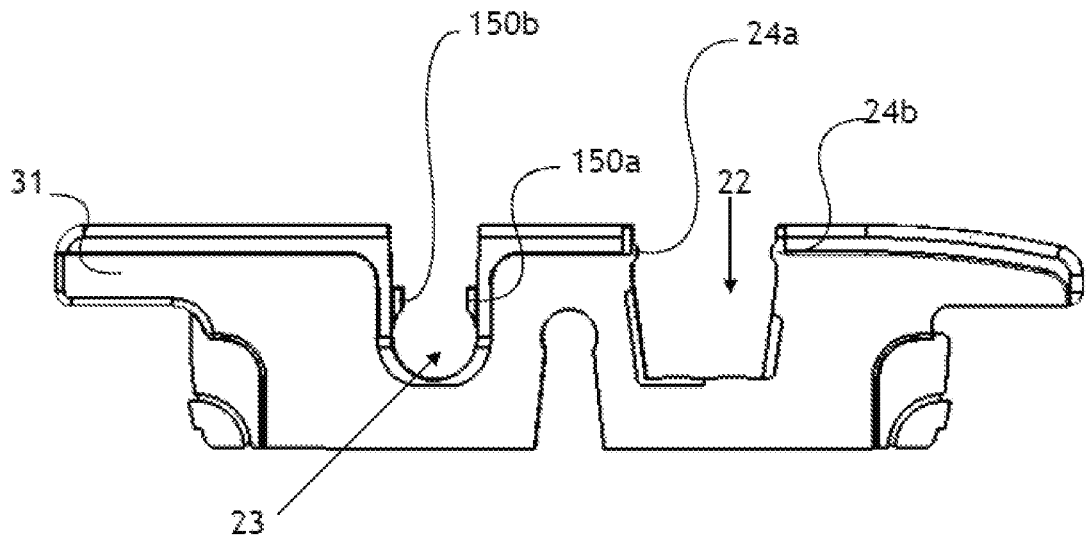
FIG. 6 is side view of an embodiment of a connector of the disclosure.

FIG. 6 is a side view of an embodiment of the connector 1 that illustrates the retaining pin aperture 23 and the retaining pin lock structure 150*a*, 150*b* therein for locking retaining pins that are inserted into the apertures and holding them within the aperture structure. The retaining flanges 24*a, b* are also illustrated for holding a trapezoid roller of a trapezoid roller style wiper arm in place within the groove 22.

Figure 7:
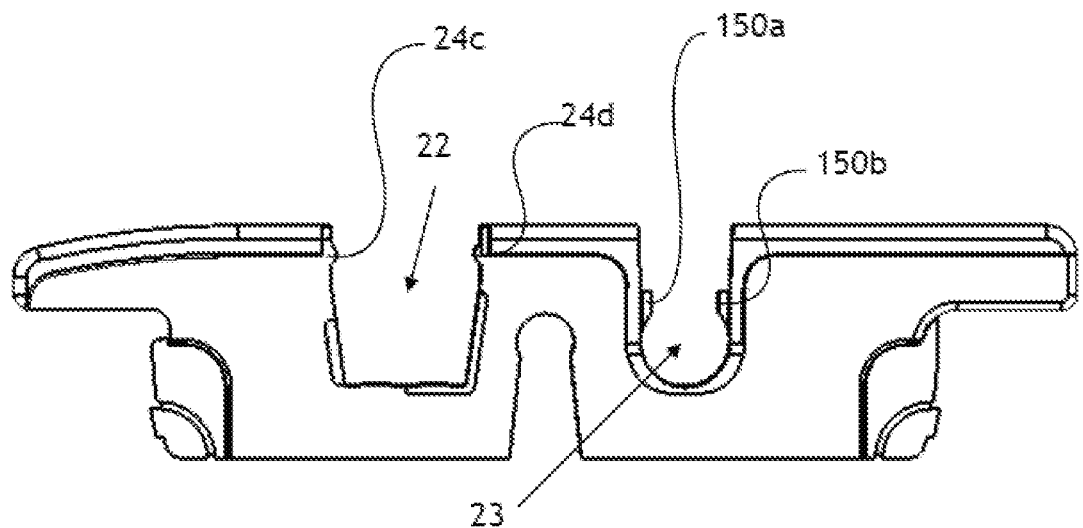
FIG. 7 is an opposing side view of the embodiment of the connector of the disclosure shown in FIG. 6.

FIG. 7 is an opposite side view of the embodiments of the connector 1 illustrated in FIG. 6. FIG. 7 illustrates the retaining pin aperture 23 and the retaining pin lock structure 150*a*, 150*b* therein. The retaining flanges 24*c, d* are also illustrated within the groove 22.

Figure 8:
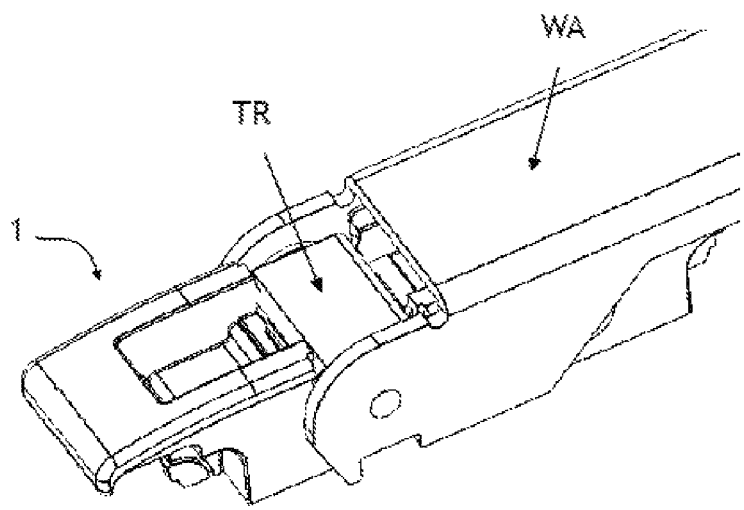
FIG. 8 is a top perspective view of a prior art wiper arm having a trapezoidal roller as connected to a connector of the disclosure.
Figure 9A:
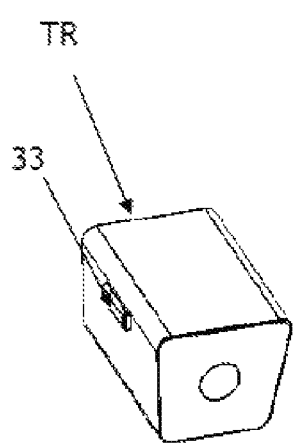
FIG. 9A is a top, front perspective view of a trapezoidal roller for a wiper arm.
Figure 9B:
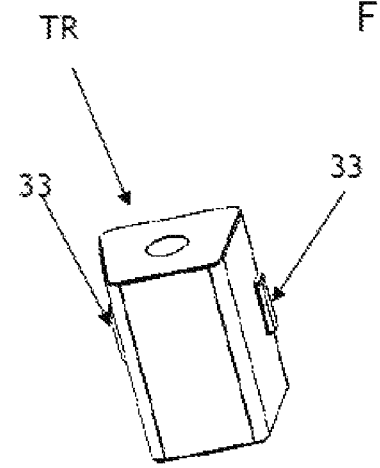
FIG. 9B is a bottom, front perspective view of the trapezoidal roller for a wiper arm shown in FIG. 9A.
Figure 10:
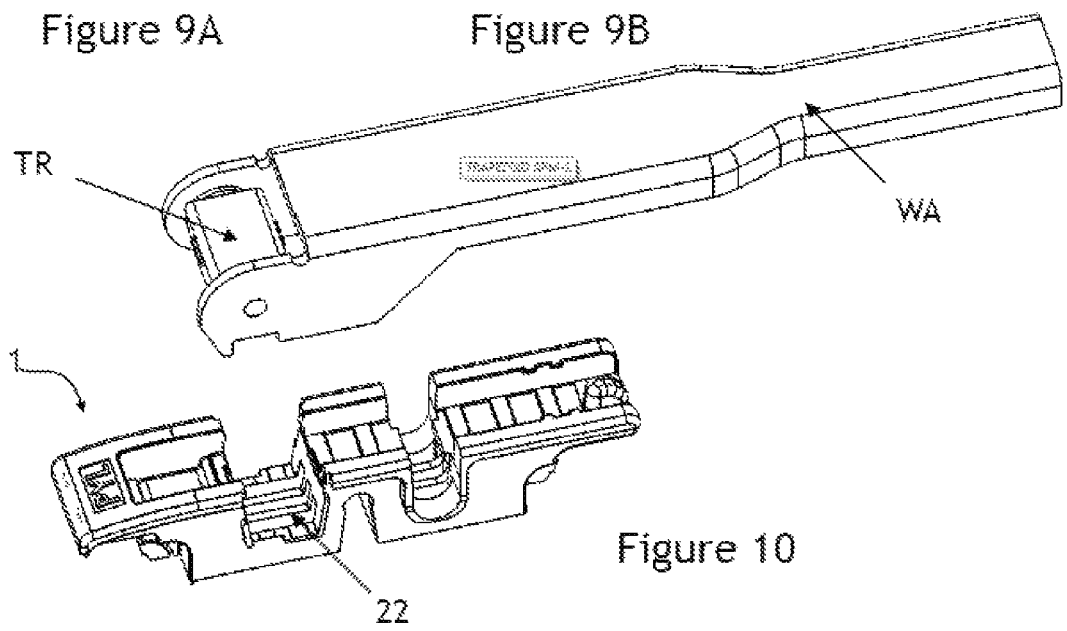
FIG. 10 is a top perspective view of a prior art wiper arm having a trapezoidal roller prior to being connected to a connector of the disclosure.

FIG. 8 illustrates an embodiment of a connector 1 of the disclosure connected to a windshield wiper arm in one of several possible configurations. As shown, the trapezoid roller TR of a trapezoid roller style wiper arm (WA) is in place within the groove 22 of the connector 1. FIGS. 9A and 9B illustrate a type of trapezoid roller that may be on a wiper arm (shown unattached to the wiper arm for illustrative purposes). As shown, the rollers may have side appendages 33 for engaging the channel indentions 34*a*, 34*b* on each side of the groove 22. FIG. 10 illustrates the connector and wiper arm shown in FIG. 8 before attachment. The shaft of the wiper arm rests against the top surface 19 of the connector 1 when the roller is attached to the groove 22 of the connector 1.

Figure 11A:
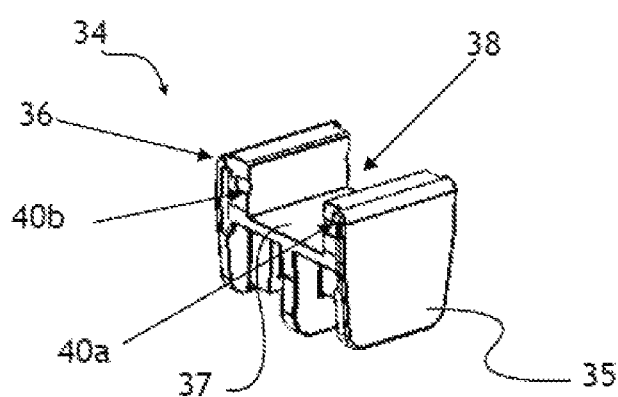
FIG. 11A is a perspective view of a groove cover for a connector of the disclosure.
Figure 11B:
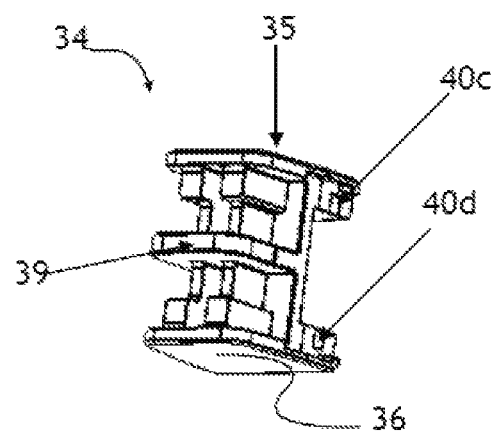
FIG. 11B is a bottom perspective view of the groove cover shown in FIG. 11A.
Figure 12:
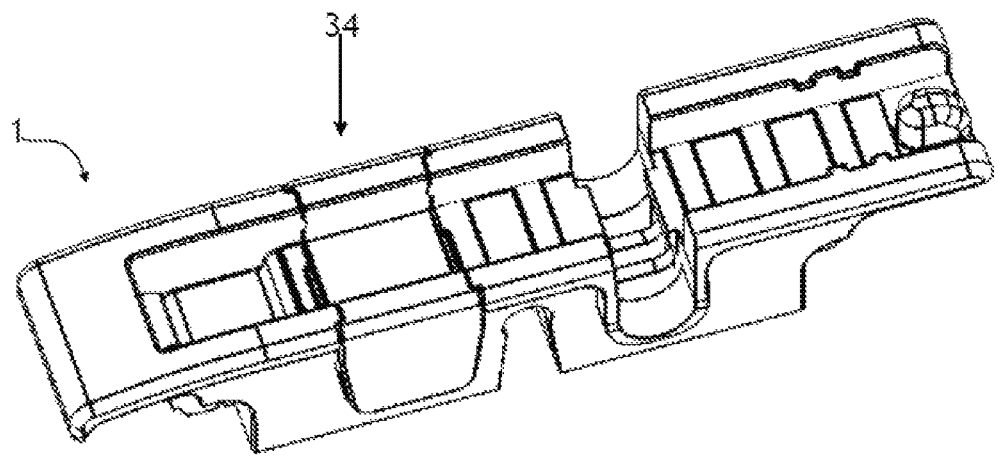
FIG. 12 is a perspective view of a connector of the disclosure with a groove cover attached thereto.

FIGS. 11A and 11B illustrate a groove cover 34 that may be utilized to cover the groove 22 of the connector 1 when wiper arms other than a trapezoid roller style wiper arm is being utilized with the connector. The groove cover 34 comprises a groove cover first side 35 and a groove cover second side 36 with a groove cover top wall 37 connecting the two side walls such that a groove cover channel 38 is formed between the two side walls. As shown in FIG. 11B, the underside of the groove cover 34 comprises one or more support structures 39. As also illustrated in FIGS. 11A and 11B, the groove cover 34 may also have groove cover notches 40*a, b, c, d* on each end of the side walls which are configured to engage the retaining flanges 24*a, b, c, d* extending into the space of the groove 22 to lock (i.e., snap) the groove cover 34 into place. FIG. 12 illustrates a connector 1 of the disclosure with a groove cover 34 in place. As shown, the groove cover is shaped to complement and match the configuration of the connector side walls and channel and substantially hides the groove 22.

Figure 13:
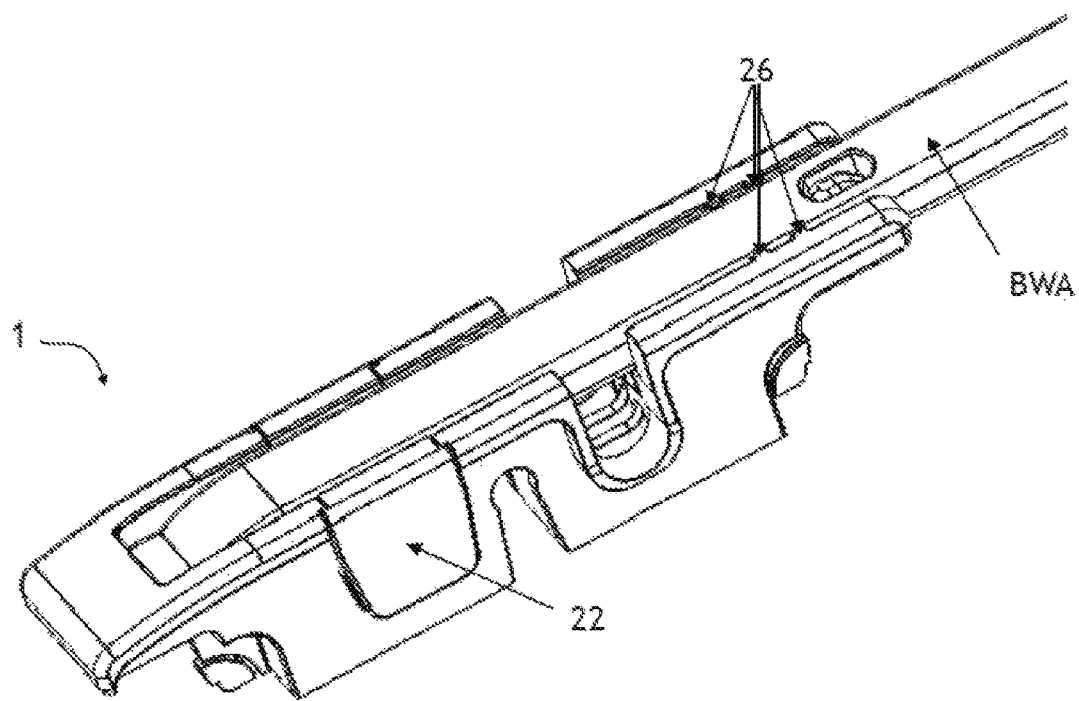
FIG. 13 is a top perspective view of a prior art notched bayonet style wiper arm as connected to a connector of the disclosure.
Figure 14:
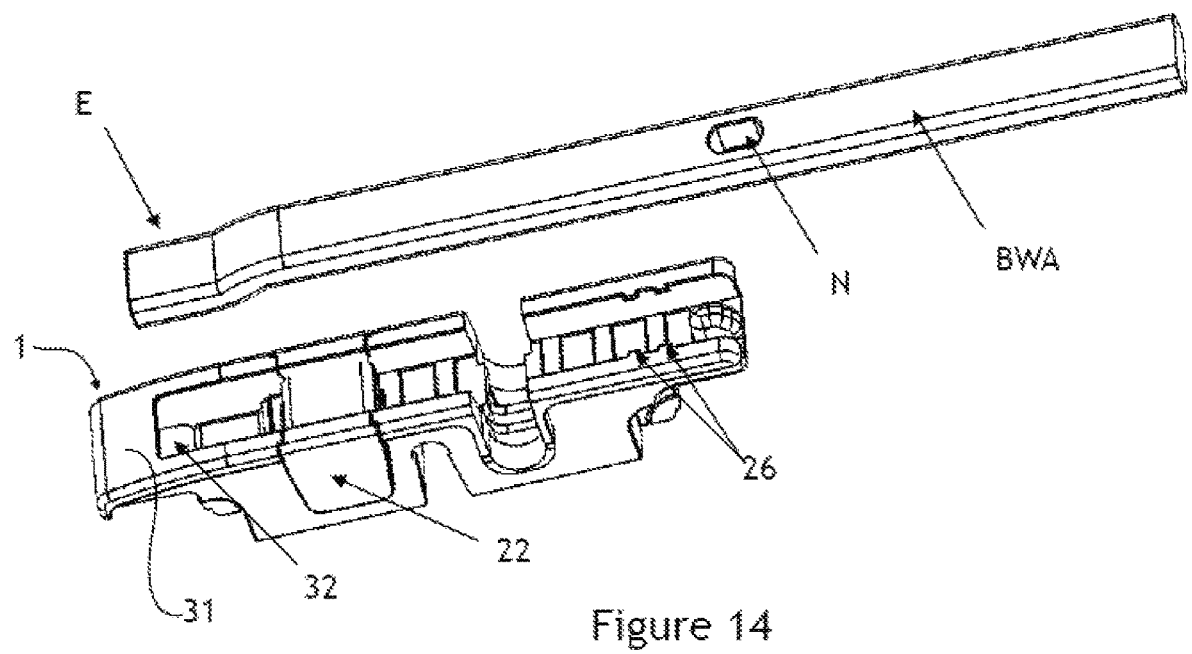
FIG. 14 is a top perspective view of a prior art notched bayonet style wiper arm prior to being connected to a connector of the disclosure.

FIG. 13 illustrates a notched bayonet style wiper arm (BWA) as attached to a connector 1 of the disclosure. The wiper arm BWA prior to attachment with the connector 1 is shown in FIG. 14. As shown, the connector 1 has a groove cover 34 in place; however, one skilled in the art would recognize that the groove cover 34 could be absent from the connector 1. The pillar 25 of the connector 1 slides into the notch N of the wiper arm BWA when the wiper arm BWA is properly seated into the connector 1. The end E of the wiper arm BWA slides into the opening 32 underneath the proximal shelf 31 that is sized to receive the end E of a bayonet style arm such that the end E now rests underneath and against the proximal shelf 31. The one or more retaining appendages 26 snap the arm into place and help to retain the position of the arm within the channel 21 of the connector1.

Figure 15:
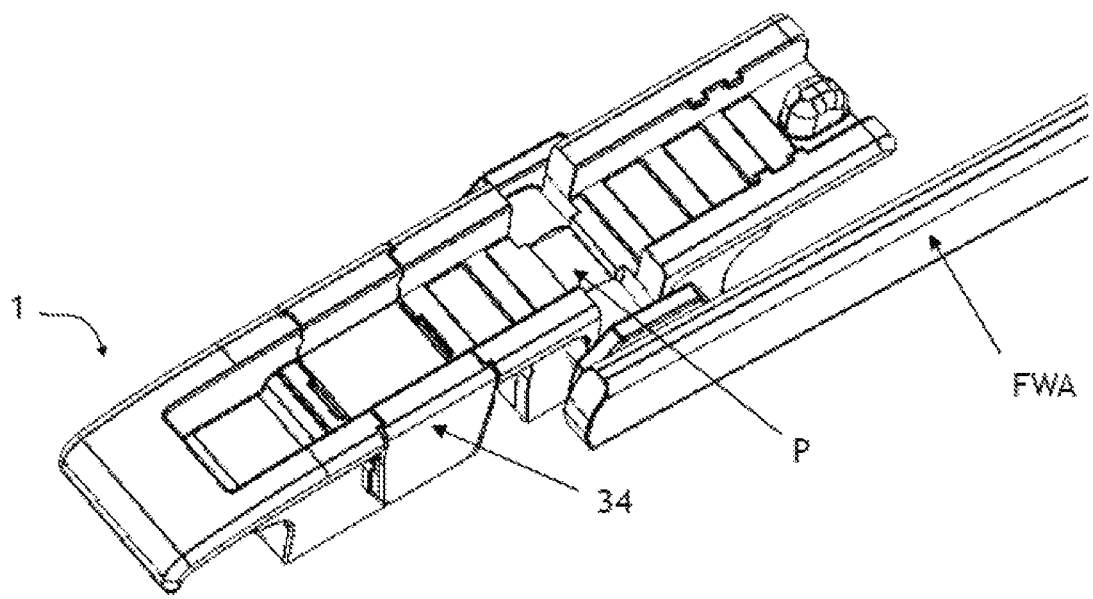
FIG. 15 is a top perspective view of a prior art French pin style wiper arm as connected to a connector of the disclosure.
Figure 16:
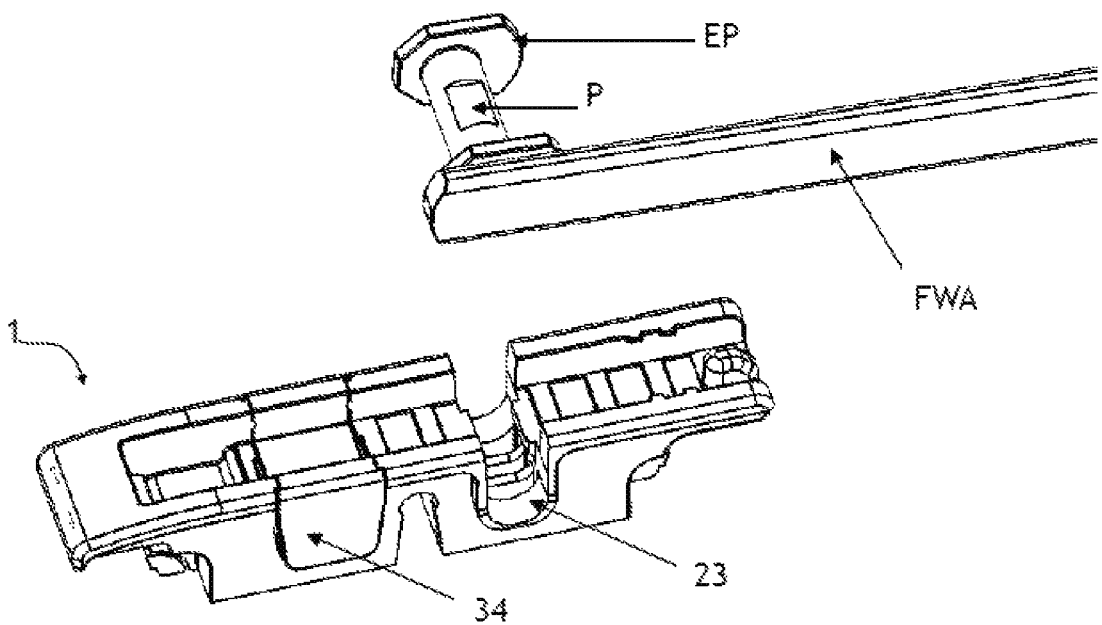
FIG. 16 is a top perspective view of a prior art French pin style wiper arm prior to being connected to a connector of the disclosure.

FIG. 15 illustrates a French pin style wiper arm (FWA) as attached to a connector 1 of the disclosure. The wiper arm FWA prior to attachment with the connector 1 is shown in FIG. 16. As shown, the connector 1 has a groove cover 34 in place; however, one skilled in the art would recognize that the groove cover 34 could be absent from the connector 1. The retaining pin P of the wiper arm FWA engages the retaining pin aperture 23. The retaining flanges 24 within the aperture helps to lock (i.e., snap) the retaining pin P into place. The retaining pin P may also have an end plate EP that prevents the pin P from sliding out of the retaining pin aperture 23 when seated therein. It is also contemplated that the connector 1 of the present disclosure could be utilized with a retaining pin that does not have an end plate EP. For instance, a retaining pin P with varying diameters thereon creating an edge that the retaining flanges 24 may rest against and function to prevent the retaining pin P from being released from the connector 1.

As can be seen from FIGS. 8, 10, 13, 14, 15 and 16, the same connector 1 can be used with differing windshield wiper arms. This allows a reduced inventory that can satisfy the needs of a larger number of windshield wiper arm types.

In operation, the windshield wiper connector 1 disclosed by this invention allows a single windshield wiper to be used in conjunction with windshield wiper arms having a wide variety of configurations. This reduces manufacturing cost, inventory cost, and provides for easy replacement of windshield wipers as needed.

In certain embodiments, the connector 1 may be connected to the wiper blade prior to connecting to the wiper arm. In certain embodiments, the connector 1 may be connected to the wiper arm prior to being connected to the wiper blade. In certain embodiments, the connector 1 may either be first connected to the wiper arm or to the wiper arm.

Figure 17:
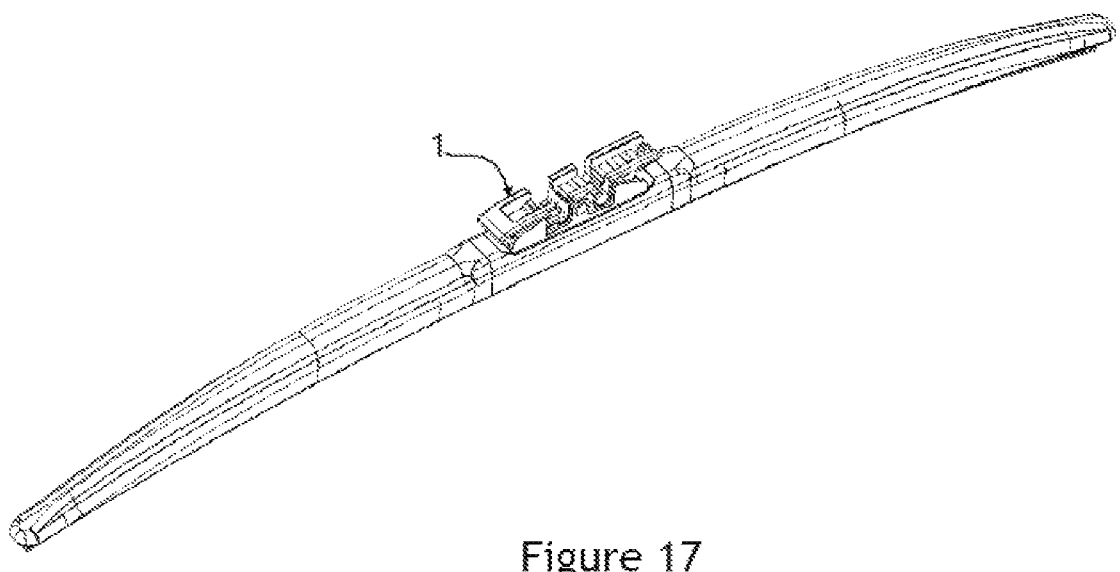
FIG. 17 illustrates a connector of the disclosure connected to a wiper blade.

Another embodiment of the invention is a wiper blade provided with a connector as described above, or as shown in FIG. 17. The wiper blade may be of any type suitable for use with the present invention. For example, the wiper blade can be a traditional wiper blade having a plurality of frames which carry a wiper strip which act as a force distribution structure, and having a mounting base. Alternatively, the wiper blade may be a beam blade, having one or more spring-elastic beams which act as a force distribution structure, a wiper strip, and a mounting base. The wiper blade may also be a hybrid wiper blade, which has a combination of a beam and one or more frames that collectively act as a force distribution structure, a wiper strip, and a mounting base. Regardless of the type of wiper blade, the connector 1 can be adapted to connect to the wiper blade, for example, via a rivet on the wiper blade (which is commonly located in a mounting base or in the frame of the wiper blade) and a rivet passage 29 and arcuate rivet clips 30 *a, b* on the connector 1. Any other method discussed above or otherwise known in the art would also be suitable, such as having one or more pins, holes, recesses, channels, or other structure in the wiper blade, and having corresponding pin clips, detents or pins or any other structure complimentary to the structure in the connector 1.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connector. The number or position of the retaining pin apertures, locking apertures, or other mechanisms can vary so long as they are capable of performing their intended function.

I claim:

1. A windshield wiper connector for connecting a first, second, or third type of wiper arm with a windshield wiper, the connector having a proximal end and a distal end longitudinally opposed to the proximal end, the connector comprising:
    a peripheral wall having at least two opposing peripheral side walls, and the opposing peripheral side walls each have a retaining pin aperture aligned with one another;
    a top surface extending from one of the at least two opposing peripheral side walls to another of the at least two opposing peripheral side walls;
    a channel formed in the top surface between the two opposing peripheral side walls, and extending longitudinally along the connector;
    a groove proximate the proximal end of the connector, the groove defining a break in the channel;
    a groove cover insertable within the groove, a top surface of the groove cover defining a groove cover channel which is aligned with the channel when the groove cover is inserted within the groove; and
    a pillar extending upwards from the channel proximate the distal end;
    wherein the groove is sized to receive a trapezoidal roller of the first type of wiper arm,
    wherein the channel is sized to receive a portion of the second type of wiper arm and the pillar is sized to be inserted into a notch of the second type of wiper arm, and
    wherein the retaining pin apertures are sized to receive a retaining pin of the third type of wiper arm.

2. The connector of claim 1 wherein the top surface of the connector further comprises a proximal shelf with an opening underneath the proximal shelf that is sized to be capable of receiving an end of the second type of wiper arm such that a bottom side of the second type of wiper arm rests against the top surface.

3. The connector of claim 1 wherein the second type of wiper arm is a bayonet style and the third type of wiper arm is a pin type.

4. The connector of claim 1 wherein the channel comprises opposing side channel walls, and each side channel wall comprises one or more retaining appendages extending a distance towards opposing side channel walls.

5. The connector of claim 4 wherein the one or more retaining appendages are capable of holding the second type of wiper arm against top surface.

6. The connector of claim 4 wherein the retaining appendages are sized such that they are capable of snapping the second type of wiper arm into place as the second type of wiper arm is pressed towards the top surface.

7. The connector of claim 1 further comprising at least one rivet passage and arcuate rivet clip in each of the opposing peripheral side walls that are capable of accepting and securing a rivet of the wiper blade, thereby securing the connector to the wiper blade.

8. The connector of claim 1 further comprising at least one internal longitudinal support wall extending downwards from the top surface and extending substantially along the longitudinal direction of the connector.

9. The connector of claim 1 comprising at least one internal perpendicular support wall extending downwards from the top surface and extending substantially from the one side wall of the connector to the another side wall.

10. The connector of claim 1 wherein the groove cover includes a plurality of groove cover notches and each peripheral side wall includes a retaining flange projecting into the groove, and each groove cover notch is engaged with a retaining flange thereby securing the groove cover within the groove when inserted.

11. A wiper blade assembly connectable with a first, second, or third type of wiper arm, the wiper blade assembly comprising:
    a wiper blade including a wiper strip, a force distribution structure, and a connection device; and
    a connector having a proximal end and a distal end longitudinally opposed to the proximal end, the connector comprising:
        a peripheral wall having at least two opposing peripheral side walls, and the opposing peripheral side walls each have a retaining pin aperture aligned with one another;
        a top surface extending from one of the at least two opposing peripheral side walls to another of the at least two opposing peripheralside walls;
        a channel formed in the top surface between the two opposing peripheral side walls, and extending longitudinally along the connector;

a groove proximate the proximal end of the connector, the groove defining a break in the channel;

a groove cover insertable within the groove, a top surface of the groove cover defining a groove cover channel which is aligned with the channel when the groove cover is inserted within the groove; and a pillar extending upwards from the channel proximate the distal end;

wherein the groove is sized to receive a trapezoidal roller of the first type of wiper arm, wherein the channel is sized to receive a portion of the second type of wiper arm and the pillar is sized to be inserted into a notch of the second type of wiper arm, and wherein the retaining pin apertures are sized to receive a retaining pin of the third type of wiper arm.

12. The wiper blade assembly of claim 11 wherein the top surface of the connector further comprises a proximal shelf with an opening underneath the proximal shelf that is sized to be capable of receiving an end of the second type of wiper arm such that a bottom side of the second type of wiper arm rests against the top surface.

13. The wiper blade assembly of claim 11 wherein the second type of wiper arm is a bayonet style and the third type of wiper arm is a pin type.

14. The wiper blade assembly of claim 11 wherein the channel comprises opposing side channel walls, and each side channel wall comprises one or more retaining appendages extending a distance towards opposing side channel walls.

15. The wiper blade assembly of claim 14 wherein the one or more retaining appendages are capable of holding the second type of wiper arm against top surface, and wherein the retaining appendages are sized such that they are capable of snapping the second type of wiper arm into place as the second type of wiper arm is pressed towards the top surface.

16. The wiper blade assembly of claim 11 further comprising at least one rivet passage and arcuate rivet clip in each of the opposing peripheral side walls that are capable of accepting and securing a rivet of the connection device of the wiper blade, thereby securing the connector to the wiper blade.

17. The wiper blade assembly of claim 11 further comprising at least one internal longitudinal support wall extending downwards from the top surface and extending substantially along the longitudinal direction of the connector; and at least one internal perpendicular support wall extending downwards from the top surface and extending substantially from the one side wall of the connector to the next side wall.

18. The wiper blade assembly of claim 11 wherein the groove cover includes a plurality of groove cover notches and each peripheral side wall includes a retaining flange projecting into the groove, and each groove cover notch is engaged with a retaining flange thereby securing the groove cover within the groove when inserted.

19. The wiper blade assembly of claim 11 wherein the force distribution structure comprises a beam.

20. The wiper blade assembly of claim 11 wherein the force distribution structure comprises a frame.

* * * * *